(12) United States Patent
Caps

(10) Patent No.: US 11,634,264 B2
(45) Date of Patent: Apr. 25, 2023

(54) FOIL-WRAPPED VACUUM INSULATION ELEMENT

(71) Applicant: va-Q-tec AG, Würzburg (DE)

(72) Inventor: Roland Caps, Kleinwallstadt (DE)

(73) Assignee: va-Q-tec AG

( * ) Notice: Subject to any disclaimer, the term of this patent is extended or adjusted under 35 U.S.C. 154(b) by 0 days.

(21) Appl. No.: 16/680,654

(22) Filed: Nov. 12, 2019

(65) Prior Publication Data
US 2020/0079574 A1   Mar. 12, 2020

Related U.S. Application Data

(63) Continuation-in-part of application No. 15/025,150, filed as application No. PCT/IB2014/001927 on Sep. 26, 2014, now abandoned.

(30) Foreign Application Priority Data

Sep. 26, 2013   (DE) .................... 10 2013 016 005.7

(51) Int. Cl.
   *B65D 81/38*      (2006.01)
   *F16L 59/065*    (2006.01)
   (Continued)

(52) U.S. Cl.
   CPC ............ *B65D 81/3823* (2013.01); *B32B 1/00* (2013.01); *B32B 3/04* (2013.01); *B32B 3/266* (2013.01);
   (Continued)

(58) Field of Classification Search
   CPC ......... B65D 81/3823; B32B 1/00; B32B 3/04; B32B 3/266; B32B 15/12; B32B 15/20;
   (Continued)

(56) References Cited

U.S. PATENT DOCUMENTS 3,625,720 A   12/1971   Ohba et al.
3,628,720 A   12/1971   Schmedding
(Continued)

FOREIGN PATENT DOCUMENTS

DE        10058566      2/2002
DE      102011122211    6/2013
(Continued)

*Primary Examiner* — Frank J Vineis
*Assistant Examiner* — Donald M Flores, Jr.
(74) *Attorney, Agent, or Firm* — Pandiscio & Pandiscio

(57) ABSTRACT

A foil-wrapped vacuum insulation panel having a core, and an air-tight envelope in the form of a wrapping foil surrounding the core made of powder or granulate, wherein between the core made of powder or granulate and the air-tight wrapping foil, there is provided at least one intermediate layer of cardboard and/or paperboard, which completely envelopes the core made of powder or granulate in a powder-tight manner and is formed cuboid box which has approximately the same shape as the finished vacuum insulation element, wherein the powder or granulate is filled into the cuboid box in such an amount that the body is completely filled up to its very top, and the shape of the vacuum insulation element is acquired only via the cuboid box and not by the powder or granulate, while the structural integrity of the core is not sufficient to retain the shape of the core on its own without the surrounding cardboard or paperboard box.

25 Claims, 3 Drawing Sheets

(51) Int. Cl.
  *B32B 15/20* (2006.01)
  *B32B 15/12* (2006.01)
  *B32B 29/08* (2006.01)
  *B32B 3/04* (2006.01)
  *B32B 3/26* (2006.01)
  *B32B 1/00* (2006.01)

(52) U.S. Cl.
  CPC ............ *B32B 15/12* (2013.01); *B32B 15/20* (2013.01); *B32B 29/08* (2013.01); *F16L 59/065* (2013.01); *B32B 2307/7242* (2013.01); *B32B 2419/00* (2013.01); *B32B 2439/40* (2013.01)

(58) Field of Classification Search
  CPC ............ B32B 29/08; B32B 2307/7242; B32B 2419/00; B32B 2439/40; F16L 59/065
  See application file for complete search history.

(56) References Cited

U.S. PATENT DOCUMENTS

| | | |
|---|---|---|
| 3,905,540 A | 9/1975 | Abert |
| 4,662,521 A | 5/1987 | Moretti |
| 5,399,397 A | 3/1995 | Kollie et al. |
| 2002/0018872 A1* | 2/2002 | Ehrmanntraut ......... E04B 1/803 428/76 |
| 2002/0079357 A1* | 6/2002 | Tulkoff .................. B65D 85/36 229/199 |
| 2004/0099564 A1* | 5/2004 | Leifeld ................ B65D 5/4208 206/528 |
| 2006/0065704 A1 | 3/2006 | Chang |
| 2009/0032206 A1* | 2/2009 | Gregory ................ D21C 5/005 162/158 |

FOREIGN PATENT DOCUMENTS

| | | |
|---|---|---|
| EP | 1177879 | 2/2002 |
| FR | 2589447 | 5/1987 |
| JP | 58-182726 | 12/1983 |
| JP | 61-200588 | 12/1986 |
| JP | 2-42296 | 2/1990 |
| JP | 5-81017 | 11/1993 |
| JP | H06159915 | 6/1994 |
| JP | H 08-30559 | 3/1996 |
| JP | 9-217890 | 8/1997 |
| JP | 11-201376 | 7/1999 |
| JP | 2002-167882 | 6/2002 |
| JP | 2003-28384 | 1/2003 |
| JP | 2006-104622 | 4/2006 |
| JP | 2009-91690 | 4/2009 |

\* cited by examiner

FOIL-WRAPPED VACUUM INSULATION ELEMENT

REFERENCE TO PENDING PRIOR PATENT APPLICATIONS

This patent application is a continuation-in-part of pending prior U.S. patent application Ser. No. 15/025,150, filed Mar. 25, 2016 by Roland Caps and va-Q-tec AG for FOIL-WRAPPED VACUUM INSULATION ELEMENT, which patent application in turn claims benefit of International (PCT) Patent Application No. PCT/IB2014/001927, filed Sep. 26, 2014 by va-Q-tec AG for FOIL-WRAPPED VACUUM INSULATION ELEMENT, which claims benefit of German Patent Application No. DE 10 2013 016 005.7, filed Sep. 26, 2013.

The three (3) above-identified patent applications are hereby incorporated herein by reference.

FIELD OF THE INVENTION

The invention is directed to a foil-wrapped vacuum insulation element having a core and a shell surrounding the core.

BACKGROUND OF THE INVENTION

These types of insulation elements often have a sheet- or panel-shaped design, and are used for thermal insulation, for example of buildings, refrigerators or freezers, thermal containers, etc.

The functional basis of the vacuum insulation element is that pores that are open, i.e., in communication with one another, are present within the core material which supports the shell, and are evacuated during manufacture. For this reason, within these pores the heat cannot be transported by either thermal conduction or thermal convection, resulting in an extremely good thermal insulation value, so that for the same thermal insulation properties as conventional insulation panels, such vacuum insulation panels have only approximately one-tenth the thickness.

However, one problem in the manufacture of such vacuum insulation elements is that during the evacuation, particles may be pulled out of the core, and may then either contaminate the areas of the subsequent sealing seams and make efficient, i.e., pressure-tight, sealing more difficult or even impossible, or they may enter the evacuation pump and damage or even destroy it.

SUMMARY OF THE INVENTION

To prevent this, it has already been proposed to envelop the core in a nonwoven fabric which is intended to retain entrained particles of the core. However, it has proven to be fairly complicated to completely wrap preformed cores in such a nonwoven fabric; powdered core material cannot be filled into such a nonwoven fabric web anyway.

The disadvantages of the described prior art result in the problem on which the object of the invention is based, to refine a generic foil-wrapped vacuum insulation element in such a way that the manufacture may take place easily and preferably by machine, and the particles from the core are reliably retained during evacuation.

For a generic foil-wrapped vacuum insulation element having a core and a shell surrounding the core, this object is achieved in that between the core and the shell, one or more layers of paper, cardboard, and/or paperboard are also provided which completely envelop the core, preferably in a powder-tight manner.

If the terms paper, cardboard, and paperboard are distinguished from one another in the discussion below, this is to be understood based on common usage, according to which paper has a grammage, i.e., a basis weight, of less than 150 $g/m^2$, cardboard has a grammage of 150 $g/m^2$ to 600 $g/m^2$, and paperboard has a grammage of greater than 600 $g/m^2$. However, if no distinction is made based on the grammage, the term "paper" may also include cardboard and paperboard.

In particular, this is intended to apply to material properties of these substances, which pertain equally to paper, cardboard, and paperboard. These include the following properties:

The essential base components of paper, cardboard, and paperboard materials are fibrous materials, in particular wood pulp, semichemical pulp, chemical pulp, and/or recovered paper. Substances for improving the mechanical properties in particular for sizing and impregnation, for example animal glues, resins, paraffins, and waxes, may also be contained in smaller quantities. On the other hand, frequently found fillers such as talc, kaolin, gypsum, barium sulfate, chalk, and titanium white are optional, and are therefore dispensable within the scope of the present invention. Further auxiliary agents such as defoamers, dispersants, etc., are often present for processing reasons.

The fibrous materials used, whether wood pulp, semichemical pulp, chemical pulp, and/or recovered paper, contain cellulose. This is a polysaccharide, for example having the empirical chemical formula $(C_6H_{10}O_5)_n$. This substance forms the primary component of the cell walls of plants and timber woods.

Cellulose is a polymer composed of chain-type macromolecules made up of linked-together monomers in the form of glucose molecules, $C_6H_{12}O_6$. Multiple bundles of such chain-type macromolecules constitute so-called micelles, and multiple micelles in turn form so-called fibrils, the base components of the cellulose fibers.

In the above-mentioned bundles, there are crystalline regions having a regular molecular arrangement and amorphous regions having an irregular molecular arrangement. The interaction of these different regions results in the typical properties of paper, cardboard, and paperboard, whereby the crystalline regions provide strength and rigidity, while the amorphous regions impart flexibility and elasticity to the substance in question.

Within the scope of the invention, all cellulose-containing substances are suitable in principle for paper manufacture. However, since these substances generally do not have to meet any particular requirements, the use of recovered paper, rag, or such recycling materials is particularly suited for this purpose. However, since recovered paper has already been processed once into paper, its fibers are damaged by the previous and new processing, in particular within the scope of the beating step, so that at least further additives should be provided in addition to recycled fibers. Within the scope of the invention, however, this proportion may be kept comparatively low, for example less than or equal to 30% by weight, preferably less than or equal to 20% by weight, in particular less than or equal to 10% by weight.

Due to this predominant use of materials which have sometimes been recycled multiple times, on the one hand paper is less expensive than a nonwoven fabric made of a textile material, and on the other hand is thinner, lighter, and more dense, and is therefore better suited for the present purpose than known nonwoven fabric materials, or in any case is just as good.

A single paper layer may have a grammage of 40 g/m$^2$ or more, for example a grammage of 50 g/m$^2$ or more, preferably a grammage of 60 g/m$^2$ or more, in particular a grammage of 80 g/m$^2$ or more, or even a grammage of 100 g/m$^2$ or more. On the other hand, a single paper layer may have a grammage of 250 g/m$^2$ or less, for example a grammage of 225 g/m$^2$ or less, preferably a grammage of 200 g/m$^2$ or less, in particular a grammage of 175 g/m$^2$ or less, or even a grammage of 150 g/m$^2$ or less. The preferred range of the basis weight on the one hand guarantees a high tear strength, but on the other hand limits the added weight thus introduced into the vacuum insulation panel, and ultimately does not significantly increase the thickness of the finished insulation panel; furthermore, paper of this thickness can still be folded well, and may thus have predefined folded edges at the edges of the core in order to support the design of straight edges of the finished vacuum insulation panel.

It has proven advantageous to provide multiple, preferably three, layers of paper. The strength of the material, in particular its tear strength, may thus be greatly increased, as the result of which the manufacturing process is less sensitive.

It is recommended according to the invention that at least one paper or cardboard layer is joined, preferably glued, to one or two adjoining paper or cardboard layers to form a single layer. Layers of paper or cardboard which are glued together have a higher rigidity than the same number of non-glued layers, due to the fact that the glued layers are not able to move against one another during bending.

The flexural strength may be further increased in that at least one of multiple paper or cardboard layers, preferably an inner paper or cardboard layer, has a corrugated profile. Such a corrugated layer allows the distance between the two adjoining layers to be increased. This results in the effect of an upper ply and a lower ply at a distance therefrom, which increases the strength and stability considerably. The result is generally a paperboard, as is also found in larger packaging or moving boxes.

It is preferred to provide a total of three paper layers, preferably having a grammage in each case of 40 g/m$^2$ or more, and/or having a preferred grammage in each case of 250 g/m$^2$ or less, so that the overall layer made of joined-together layers of paper or cardboard has a total grammage between 120 g/m$^2$ and 750 g/m$^2$, preferably a grammage between 150 g/m$^2$ and 600 g/m$^2$, in particular a grammage between 170 g/m$^2$ and 500 g/m$^2$. An optimal compromise is thus found between maximum tear strength on the one hand and optimal foldability on the other hand.

It is within the scope of the invention that the paper is made up of 40% by weight or more of recovered paper, preferably 60% by weight or more of recovered paper, in particular 80% by weight or more of recovered paper. This involves a method for manufacturing the vacuum insulation panels according to the invention in the most environmentally friendly way possible.

The ply or layer of paper, cardboard, and/or paperboard may be formed into an open and/or closable hollow body which has approximately the same shape as the finished vacuum insulation element. This results in the option of using an amorphous core material such as a powder or granulate, for example, which is filled into the open and/or closable hollow body and acquires its shape only via the hollow body. The advantage is that the operation of pressing a core may possibly be dispensed with altogether.

Due to the fact that the open and/or closable hollow body is produced from a single blank of paper, cardboard, or paperboard, the complexity of manufacturing may be further minimized. The particular shape may be cut out or preferably punched out from a sheet or a roll of the paper, cardboard, or paperboard material in question.

Within the scope of one preferred manufacturing method, the paper blank is folded and/or glued in order to form the open and/or closable hollow body. In particular, relatively sharp edges may be produced by folding, which in the finished vacuum insulation panel contribute to avoiding the formation of heat bridges between two adjoining vacuum insulation panels. The desired shape may be stabilized, in particular in the area of the original openings, by gluing.

The invention further provides that the paper is formed into a paper bag or into a paperboard box which preferably has approximately the same shape as the finished vacuum insulation element. A paper bag, or also a paperboard box, can completely and seamlessly envelop the enclosed core, and is therefore able to reliably retain the core particles. The paper bag may be a block bottom bag, a square bottom bag, or a cross bottom bag. The bag is preferably folded before it is filled.

Further advantages result from the fact that the paper blank is glued to form the paper bag. An adhesive which is suitable for gluing paper may be used for this purpose, for which a wide selection of standard adhesives are commercially available. The blank may preferably first be glued along two longitudinal sides to form a tubular geometry having two ends which are still open. These ends are then glued; preferably, one end is glued prior to filling with the core (material), and the other end is glued after filling with the core (material).

In order for a paper bag or a paperboard box to assume the desired shape as exactly as possible, it is folded during manufacture. This may sometimes take place before, between, or after one or more gluing or joining steps.

For a paper bag, it is recommended that this be carried out after the first gluing step, in which the blank assumes a tubular shape, and optionally before, during, or after the further method step in which the base is closed, in particular by gluing.

In contrast, a folding box may be stabilized and closed without gluing. In this case, the folding preferably takes place immediately after the punching, and when all folded edges are applied, the box shape may be assembled by bending over the folded edges. For the subsequent filling, initially an opening is left which ultimately is closed, for example by a preferably one-piece lid.

After being folded up, the box has a preferably rectangular or square base, and a border running along its perimeter, a side wall being folded upwardly in each case along each straight edge section of the base. To keep the filled core material from escaping or trickling out during and after filling of this box body in the area where two such side walls in each case meet in the region of a vertical edge, the invention provides that two adjoining side walls, i.e., vertical border or end-face surfaces, are joined together in the area of their mutual edge, preferably without gaps, up to the filling opening at the top side.

This may be achieved on the one hand by applying an adhesive tape above and along the vertical edge on the outside and/or inside.

On the other hand, it is also possible to leave a tab in the blank in the area of such an edge, on at least one side wall bordering same; the tab may then be bent over the vertical edge in question in order to lie flatly against the adjoining side wall.

This tab may then be joined to this adjoining side wall in a form-fit and/or integrally joined manner.

An integral bond is achieved by gluing over the surface, for which purpose an adhesive applied in liquid form is easily sufficient.

A form fit may be achieved by the bent-over tab being encompassed on the inside and outside by the adjoining side wall. For this purpose, the adjoining side wall should have an attached tab which, however, is preferably integrally molded onto the free longitudinal edge of the side wall (the subsequent upper edge of the body), or for the blank, is left thereon. If this tab is bent over just to this upper edge of the body, and in particular over the one or two lateral tabs in the area of one or both vertical edges of this side wall, the mutually abutting side walls are joined in a form-fit manner. For this purpose, it is advantageous for the tabs to preferably have a rectangular or trapezoidal shape, and for their parallel extension with respect to the height of the body to correspond to the height thereof, so that when an attempt is made to swing away a side wall, the tabs abut from the inside against the overlapping part between the inner and outer layers of the side wall which is bent over same.

To prevent the lid from inadvertently coming open during transport and/or temporary storage, it is recommended that the lid in the closed state is fixed to the body of the box, for example by means of an adhesive tape affixed over the closure gaps.

In particular for vacuum elements or vacuum insulation panels having an even border, the basic design may thus be reduced to an appropriate fold of a paper, cardboard, or paperboard blank which is punched out or cut out to size. In vacuum insulation panels commonly used heretofore, the high-barrier foil surrounding the core acquires its dimensional stability from a core which is pressed in the desired shape. The novel structure of a vacuum insulation panel makes it possible to do without a shaped core material. Rather, not only the wrapping foil, but also the core which supports it then acquires its shape solely from the paper, cardboard, or paperboard material which is punched out and folded in the desired shape, provided that this material has sufficient dimensional stability.

The invention may be refined in that a paper bag or a paperboard box has at least one filling opening which is closed after filling with the core material. Depending on the manufacturing method, it is possible to fill the core material into this filling opening in the powdered state, so that the core material, optionally together with the wrapping with a foil, is pressed at the earliest after the bag or the box is closed, or a core which is already pressed in the appropriate shape is inserted through the filling opening. In the case of a box, a pressing operation may even be dispensed with altogether, provided that the paperboard of the box is stiff enough to maintain its shape unchanged, at least until the evacuation step.

After the core material is filled in, the filling opening of the paper bag may be closed by means of an attached tab, which may be glued, for example.

In the closed state, the tab may preferably cover an end face of a panel-shaped vacuum insulation element. Consequently, the paper bag is weakened as little as possible due to the fact that the shape of a deep, flat pocket is relatively stable.

In the case of a paperboard box, it may be more advantageous for the filling opening of the paperboard box to be closed by a lid after the core material is filled in, for example by folding shut a lid which hangs on the body on one side, or by placing a loose lid on top. Such a lid may have at least one tongue which is delimited by a folded edge, preferably along a free edge facing away from or opposite from the joining edge between the lid and the body of the box. Such a tongue may then be optionally inserted inside the box in order to stabilize the lid. However, the lid should preferably engage externally over the body so that it does not conflict with an already filled powder or some other mixture when the lid is folded shut or placed on top. Therefore, a lid should have an apron which runs along the base area of the lid and which engages via an edge that protrudes upwardly along the base area of the body. For a loose lid, the apron and the edge should each extend along four sides of the base area in question; for a lid which hangs on the body, the apron and the edge need to extend only along the respective three free sides. Preferably, the apron of the lid should extend outside of the regarding side walls of the body of the box. Furthermore, it is preferred that the apron has the same height as the height of a regarding side wall of the body of the box.

To prevent the lid from being inadvertently flipped open, it may be joined to the body of the box with adhesive tape or in some other way, before or after the core material in powdered form, for example, is filled in.

Due to the fact that the lid, as further provided by the invention, in the closed state covers a base surface or main surface of a panel-shaped vacuum insulation element, a filling opening of maximum size is available; the filling may therefore be carried out very easily by filling the box from the top with the lid open. On the other hand, the lid, which is still open, generally does not cause an appreciable loss of stability, since the box paperboard used is comparatively solid and stable.

A further design condition provides that the paper bag or the paperboard box has at least one ventilation opening which allows the contained air to escape when the core material is filled in and/or when the paper bag is compressed or evacuated. Despite the desired property of the paper bag of reliably retaining the particles of the contained core or core powder, the bag should allow the likewise enclosed air to escape, so that no air cushions adversely affect the process step in question and/or delay the manufacturing process during the filling, pressing, and/or evacuation.

To implement the above feature, the invention further provides that a ventilation opening is formed by one or more perforations, in particular one or more needlings. Such a processing step leaves only punctiform openings, which hardly allow particles to escape but which do not represent a hindrance for air.

Further optimization may be achieved by the paper bag or the paperboard box having at least one valve or at least one valve area.

Such a valve may in particular assist with the function of preferably completely retaining the powder, in that it further reduces the potential clear opening diameter of a ventilation opening. This function is rather comparable to a filter which retains particles but allows gaseous substances to pass through.

Due to the fact that such a valve has the structure of a one-way valve, it is able to prevent escaped air from flowing back into the interior of the paper bag. Undesirable aeration during a storage phase within the scope of the manufacturing process is thus hindered or avoided.

One option for implementing a valve function is to provide perforations or needlings in all paper layers, but which are offset with respect to one another, in the area of a valve. Air, water vapor, and gas may thus escape from the interior of the paper bag, while particles are retained, since they cannot find a clear opening through which to escape.

The core material is preferably made of a powder of a porous, in particular open-pored, material and/or is pressed from such a material. Fumed silica is an example of a suitable material. However, fibrous materials such as glass fibers may also be used.

Lastly, the teaching of the invention provides that the shell includes a metal foil, in particular an aluminum foil, and/or a metallized foil, in particular a high-barrier foil. Such a high-barrier foil may have a supporting layer which is made of a plastic, and which is provided on one side with a metallization, and on the opposite side with a sealing layer, preferably a coating of a thermoplastic material. In addition, an aluminum foil should have a low-melting and therefore sealable coating on one side, made of a plastic, in particular a thermoplastic material.

Furthermore, the invention provides a method for manufacturing of a vacuum insulation panel, especially of a foil-wrapped vacuum insulation element having a core and an air-tight envelope surrounding the core, wherein one or more layers of paper, cardboard, and/or paperboard are also provided between the core and the envelope, and these layers completely envelope the core, preferably in a powder-tight manner. This method comprises the following steps:
a) providing a loose powder or granulate of the core material in a shapeless state;
b) providing a cuboid box which has approximately the same shape as the finished vacuum insulation panel;
c) closing the empty box;
d) filling the powder or granulate into the closed, cuboid box in such a way that the interior space of the box is completely filled with the powder or granulate;
e) wrapping an air-tight foil as an envelope around the closed and filled box:
f) air-tight sealing of the envelope except a remaining evacuation opening;
g) evacuating the interior of the envelope including the foil-wrapped box and the powdery core, e.g. in a vacuum chamber;
h) air-tight sealing of the evacuation opening under vacuum.

Preferably, the closed empty box is sealed along at least one of its edges, for example by a flap and/or by an adhesive tape, so that the box will not open even if the powder or granulate is filled in with an overpressure exceeding the atmospheric air pressure.

Furthermore, the powder or granulate is preferably filled into the closed box via at least one needle or at least one thin tube penetrating the box, preferably at a front face between the two base areas of a panel-shaped box.

Preferably, the powder or granulate is transported via a hose to the needle or tube.

Within the hose and/or needle or tube, the powder or granulate is transported by use of a transport fluid where the powder or granulate particles are loosely contained.

The transport fluid may be a gaseous substance. A preferred transport fluid is air which carries the powder or granulate particles and blows them into the box.

Upon injection, the powder and/or granulate and/or the transport fluid may be subject to an overpressure of 0.01 to 1 bar beyond the ambient atmospheric pressure, preferably to an overpressure of 0.02 to 0.5 bar beyond the ambient atmospheric pressure.

According to the invention, the transport fluid leaves the box without the powder or granulate through the air-permeable but powder-tight material of the box and/or through at least one slit between a lid and a body of the box, which slit functions as a filter allowing the transport fluid to pass through but the powder and/or granulate not.

Depending on the size, an injection hole in the box can be closed before wrapping the box in a foil, especially by an adhesive tape or the like.

The core can be pressed and compacted in the evacuation chamber during the evacuation of the interior of the envelope including the foil-wrapped box and the powdery core, and/or it will be pressed by the ambient atmospheric air pressure after the evacuation.

Without active mechanical pressing, the pressure load of the product will be limited to the ambient atmospheric air pressure, which is about 10 tons per square meter, provided there is an ideal vacuum inside the envelope. This pressure is much less than the pressure under which a conventional core is normally pressed into its shape by a hydraulic press. Such pressure may be 3 to 10 times higher than the atmospheric pressure, for example between 30 tons per square meter and 100 tons per square meter, or even more, in order to get the powder or granulate into the shape of a rigid plate or panel which can be handled and wrapped into an air-tight foil for the manufacture of a vacuum insulation panel. For this reason, the core according to the present invention is much less compacted than a conventional core plate shaped by a mechanical pressure. Therefore, if the core would be aerated by opening the envelope, a conventional core plate shaped by a mechanical pressure of 3 bar or more would retain its shape, while the unshaped core according to the invention pressed only by a pressure of about 1 bar would crumble and tend to return into its original powdery state.

For this reason, there is a clear structural difference between a conventional core plate shaped by a mechanical pressure in the state of the art and the use of a powder or granulate which is less compated by the atmospheric air pressure of about 1 bar.

The method according to the invention has influence on several parameters:

The less compacted core according to the present invention has less density than the mechanically pressed cores of the state of the art, and therefore, less material is needed for the core. Furthermore, the thermal insulation performance is superior over the state of the art due to the powder's lower density.

According to the present invention, the core can be made of one or more materials comprised by the group consisting of pyrogenic silica, precipitated silica, perlite and a powder of an organic foam material. Such powder of an organic foam material may, for example, be polystyrene.

In case of a core made of pyrogenic silica, in the filled and evacuated state of the vacuum insulation element, the density of the core made of pyrogenic silica may be between 120 kg/m$^3$ and 180 kg/m$^3$, especially between 130 kg/m$^3$ and 170 kg/m$^3$, and more especially between 140 kg/m$^3$ and 160 kg/m$^3$, which is typically about 20 percent lower than the density of a conventional, mechanically pressed, panel-shaped Silica powder core.

BRIEF DESCRIPTION OF THE DRAWINGS

Further features, particulars, advantages, and effects based on the invention result from the following description of several preferred embodiments of the invention, and with reference to the drawings, which show the following.

DETAILED DESCRIPTION OF THE PREFERRED EMBODIMENTS

Figure 1:
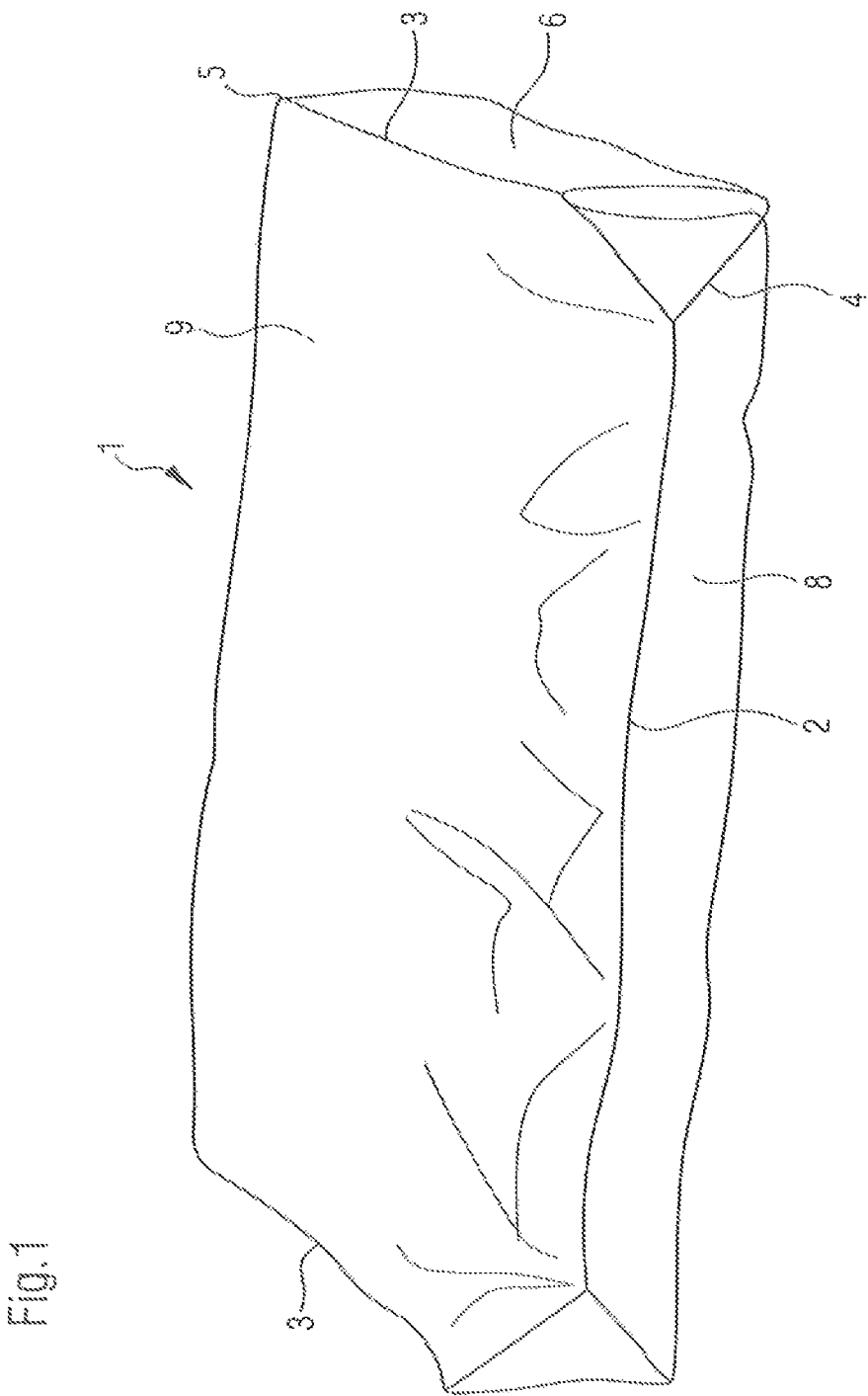
FIG. 1 shows a perspective view of a paper bag which is filled with core material, with a cross bottom bag fold, prior to the enveloping in a foil.

The manufacture of a vacuum insulation element according to the invention is as follows:

First, a paper bag 1 is produced.

For this purpose, paper is selected which, for example, is manufactured using primarily recovered paper, preferably having a basis weight between 50 and 100 g/m².

Within the scope of the invention, at least one web or one sheet of the paper is perforated at predefined locations by means of one or more needles.

Multiple webs or sheets of this type are then cut off and/or selected and placed on top of one another or joined together in such a way that the perforations in respectively adjoining layers are slightly offset with respect to one another, in particular in such a way that the perforations do not overlap one another at all, but instead preferably even have a fairly large spacing between them. Approximately three paper layers preferably lie one above the other.

Next, these overlayered paper sheets or combined paper webs are glued to form a multilayer paper composite. It should be ensured that no adhesive is able to enter the area of the perforations.

A blank having a suitable, preferably rectangular, outline is then produced, for example punched out or cut off, from this multilayer paper material.

Two oppositely situated longitudinal sides of this blank are then glued together, using an adhesive that is suitable for paper. The paper blank thus acquires the shape of a tube.

This tube is then preferably folded in such a way that folded edges 2 extending in the longitudinal direction result. Depending on the manufacturing method, this step could also take place before the longitudinal edges are glued. Two, four, or six folded edges 2 extending in the longitudinal direction of the tube could be provided, depending on the folding method.

One end of this tube is then closed. For this purpose, the borders of the blank are folded inwardly at an end which is still open, at fold lines 3 which extend transversely with respect to the longitudinal edges 2, optionally forming further folded edges 4 in the area of the corners 5 of the future paper bag 1 which are formed by the longitudinally and transversely extending folded edges 2, 3.

Next, this end of the tube 1, which is still open, is closed by gluing together the inwardly turned border areas 6 of the blank, likewise by means of an adhesive that is suitable for paper.

The core material is now filled into the paper bag 1. An open-pored material, for example fumed silica, is used for the core. This material may either be filled into the bag in the powdered state, or prior to filling it may be pressed into the desired shape of the vacuum insulation element in question and then inserted into the paper bag 1 as a block- or panel-shaped body, for example.

When this is done, the paper bag 1 is closed at its last remaining open end, likewise by means of an adhesive that is suitable for paper. Either prefolded fold lines 3, 4 may be used, in particular when powdered core material is used, or the folds 3, 4 in question are made over the edges of a prepressed core body, i.e., by simply folding a corresponding border area 6 over the edges of the core in question. It is possible to provide further folds 4, in addition to the folded edges 3 which extend transversely with respect to the longitudinal edges 2 of the original tube, in the corner areas 5 where these transverse folded edges 3 meet the longitudinal edges 2, so that areas of the paper blank which protrude in the corners 5 may be folded over one another in multiple layers.

In a subsequent method step the paper bag 1 is closed, in particular glued, at its last remaining open end.

Due to the type of blank and its folding and optionally gluing, the finished paper bag 1 now has a flat, cuboidal shape, for example, with two large, approximately rectangular base areas 9 which are joined together at their four mutually corresponding edges by further faces, namely, along their shorter edges 3, by means of smaller end faces 6 and via longer end faces 8 in the area of the longitudinal edges 2. Naturally, due to the flexible, foldable paper material, these faces 6, 8, 9 are not actually flat and stable, and instead are puckered inwardly and outwardly, as seen in FIG. 1. However, the above-mentioned faces are at least fairly flat due to the various folds 3, 4; a folding triangle 10 may be present in the joint areas between every two end faces 6, 8 of different lengths in order to fold away excess paper.

After this is done, there are multiple method variants. If the core material has been filled in as a powder, the completely closed paper bag 1 may subsequently be pressed into the desired shape of the finished vacuum insulation panel.

Otherwise, in particular if a preformed core has been inserted into the paper bag 1, this work step may be omitted, and instead the operation now described, in which the closed paper bag 1 is wrapped in a foil, takes place immediately.

This foil may be a metal foil, for example, in particular an aluminum foil or a high-barrier foil, wherein a supporting foil layer made of a plastic is provided on one side with a metal layer, for example is vapor-deposited with the metal in question, while a sealing layer made of a low-melting thermoplastic is coated on the opposite side.

A blank is produced from the selected foil, similarly as for the blank for the paper bag 1. Ideally, the blank for the foil may be identical to the blank for the paper bag 1. However, two preferably congruent foil blanks, each of which has a slightly larger surface area than the base area of a panel-shaped core, may also be produced.

The foil is now placed around the paper bag 1.

For this purpose, when a single foil blank is used, preferably in a first method step the foil is wrapped completely around the paper bag 1 in one direction until it encloses the paper bag in a tubular manner. A first sealing seam is then created, thus sealing together the two directly adjoining edges of the foil blank after the paper bag 1 is wrapped, resulting in a tubular geometry.

At least one of the two ends of this foil tube is completely closed in a subsequent method step.

With a flat core body, this may take place in particular in that the two flat end areas lie directly one on top of the other by folding in the end areas in question and sealing them to one another. On the other hand, for this purpose the foil may also be turned inwardly at the narrow sides, and protruding foil sections may be folded away in the corner areas by creating additional folded edges which meet in the area of a corner of the core body or of the paper bag 1 which surrounds it.

The oppositely situated tube end of the foil may also be closed, at least partially, preferably leaving an evacuation opening.

When two foil blanks are used, they are arranged approximately congruently with respect to one another, above and below the body or paper bag 1, with their sealing layers facing one another. The core is situated in the appropriate orientation therebetween, similar to the filling between the two pieces of bread in a sandwich. The two protruding border areas of the foil blanks may then be sealed together all around, with only an evacuation opening remaining.

An evacuation opening may be situated at any desired location in the area of any sealing seam, or at some other suitable location, but preferably in the vicinity of one or more perforations or other ventilation openings in the paper bag 1. Normally, a single evacuation opening is sufficient overall, although multiple evacuation openings could be provided.

If it has not already been done, the vacuum insulation element which has been finished but not yet evacuated may now be brought into its desired shape, preferably by means of a press, which compresses the vacuum insulation element in particular in a direction perpendicular to its base area.

In a subsequent manufacturing step, the vacuum insulation element, which is not yet evacuated, is now placed in a vacuum chamber and evacuated, for example to a pressure of less than 100 mbar, preferably to a pressure of 10 mbar or less, in particular to a pressure of 1 mbar or less. In the process, the air still contained flows outwardly through the perforations in the bag, without particles of the core also being able to follow due to the fact that they are retained by the paper bag 1, and unlike the air, are not able to escape.

The evacuation opening(s) still remaining is/are closed, in particular sealed, during this evacuated state, and the vacuum insulation element is finished.

Figure 2:
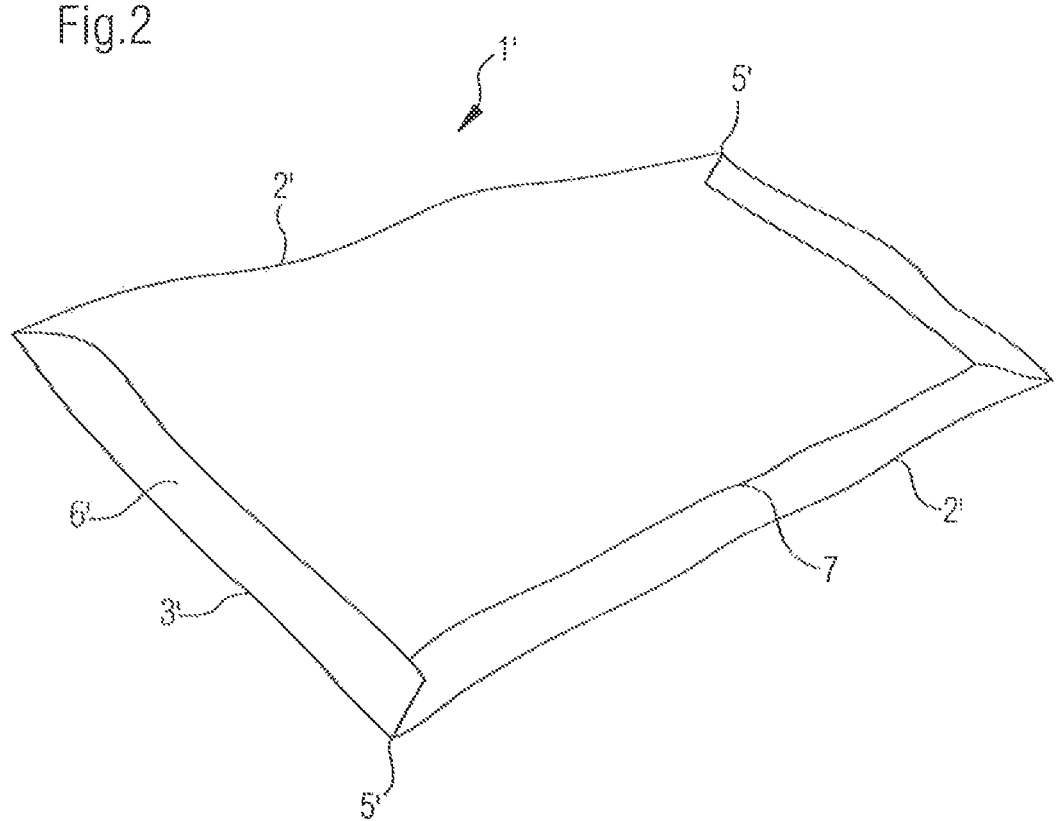
FIG. 2 shows an illustration, approximately corresponding to FIG. 1, of a modified embodiment of the invention with a flat bag fold.
Figure 3:
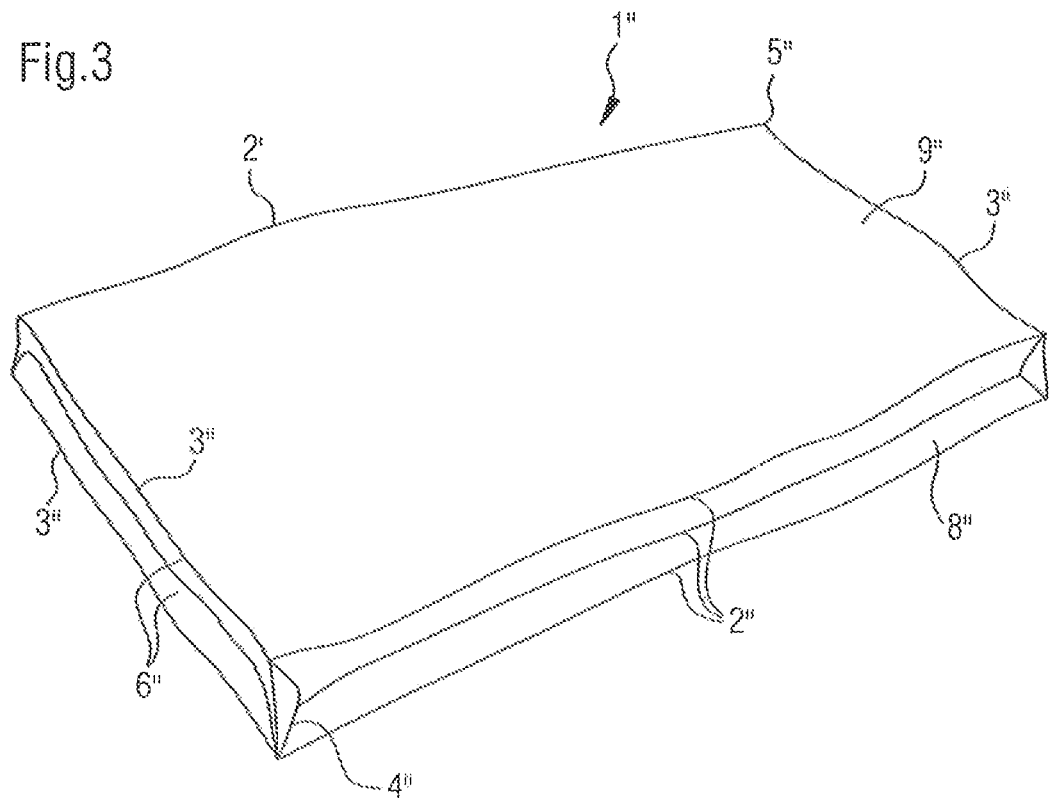
FIG. 3 shows another modified embodiment of the invention, with a square bottom bag fold in an illustration corresponding to FIG. 1.

The embodiments of the paper bags 1, 1', 1" according to FIGS. 1 to 3 differ from one another primarily by the folding technique used.

A fold of the paper bag 1 according to the cross bottom bag principle is depicted in FIG. 1. Visible are only two longitudinal edges 2, as well as a base which is formed by the folded-over border areas 6 and which extends approximately at right angles to the adjoining faces of the filled paper bag 1, and which in this application forms an end-face side of the finished vacuum insulation panel. In the cross bottom fold there are two four transverse folded edges 3, but only two pronounced longitudinal folded edges 2.

FIG. 2 shows a paper bag 1' which is filled with core material and folded according to the flat bag principle. This means that there are no end-face sides characterized by folds, but, rather, similar to an envelope, there are two longitudinal fold edges 2' and an adhesive 7 running in the longitudinal direction, but only two transverse folded edges 3' extending transversely thereto. This paper bag 1' has the approximate shape of an envelope.

In contrast, FIG. 3 shows a paper bag 1" which likewise is filled with core material and provided with folds similar to a square bottom bag. There are once again four pronounced end-face sides here, similarly as for the paper bag 1 according to FIG. 1; however, the two longitudinal end-face sides 8 here, extending in the longitudinal direction, i.e., parallel to the longitudinal edges 2", are separated from the two bag base sides 9 by fold lines 2". Thus, there are a total of four transverse folded edges 3" and a total of six longitudinal folded edges 2", four of which each form a convex edge viewed from the outside, and the two remaining folded edges are originally concavely folded but stretch out in the filled state.

All embodiments share the common feature that a valve function is preferably provided, preferably due to offset perforations in the various paper layers of the paper bag 1, 1', 1" in question, which allows air to escape from the paper bag 1, 1', 1", but not particles of the core material contained therein.

Figure 4:
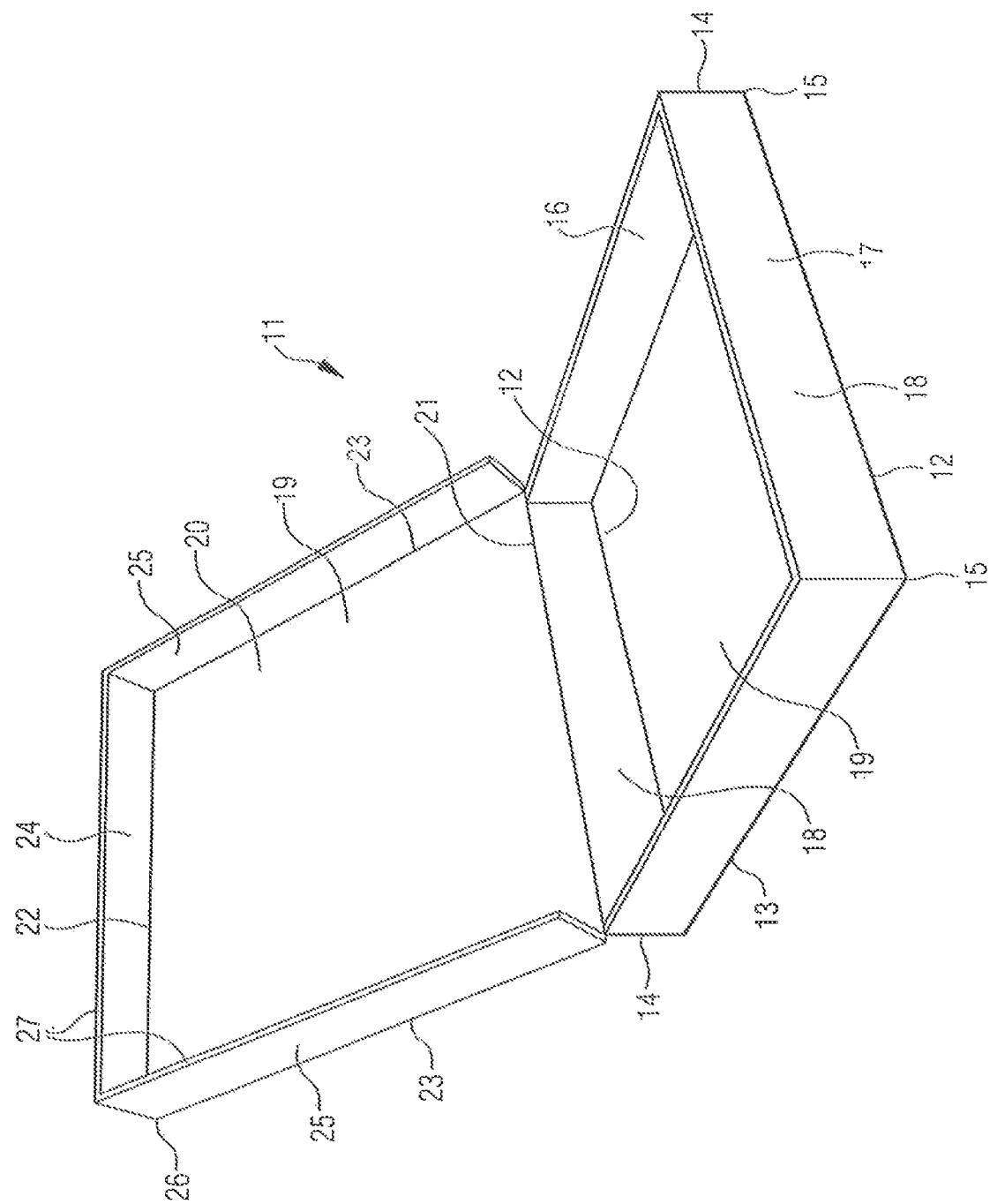
FIG. 4 shows a still unfilled paperboard box for yet another modified embodiment of the invention, in a perspective illustration.

The illustration according to FIG. 4 concerns a slightly modified embodiment of the invention. This is a folded bag which is not made of a lightweight and thus very flexible paper for filling in the core material, but, rather, is a folded box made of a stiffer cardboard or paperboard material. Although this box may generally be made of cardboard or also paperboard, in the following discussion and within the scope of this overall patent application the term "paperboard box" is to be used in a representative sense. The term "paperboard box" is thus intended to also encompass boxes made of cardboard. One difference between cardboard and paperboard was mentioned at the outset, and concerns the grammage, and thus naturally also the strength of the material in question.

A further, optional feature is that multiple layers may be present which are joined together, for example glued to one another. It is also possible for an inner layer to have corrugation, so that due to the corrugation there is a distance between two outer layers adjoining the inner layer on both sides which corresponds approximately to the overall height or thickness of the corrugation. Paper or cardboard layers adjoining same on both sides may thus fulfill the function of an upper ply and a lower ply, similarly as for bending of building materials under load. The overall material composite thus acquires much higher flexural strength than one or more single layers that are not joined together.

It is also apparent from FIG. 4 that the paperboard box 11 is made up essentially of a body 17 and a lid 20.

The body 17 as well as the lid 20 preferably each have a large rectangular or square box base area 19; these two box base areas 19 have the same shape and also approximately the same size. However, for closing, the lid 20 is pulled over the body 17 and overlaps it, preferably on its outer side; for this reason the lid base area 19 should have approximately twice the thickness of the cardboard or paperboard material, and should be longer and also wider than the body base area 19.

An approximately vertically projecting longitudinal end face 18 adjoins, in each case via one fold each along a front and a rear longitudinal edge 12 of the body base area 19.

Similarly, the body base area 19 continues at its two lateral edges 13, in each case in the form of a right and a left border face 16.

A vertical edge 14 is situated in the corners 15 of the box base area 19 of the body 17 where a longitudinal end face 18 and a lateral border face 16 meet in each case. Since all faces 16, 18 which extend upwardly from the box base area 19 of the body 17 are thus joined together, the body 17 has approximately the shape of a cuboidal trough that is closed at the bottom and at four sides and is open only at the top. Powdered or fibrous core material may be easily filled therein, preferably exactly enough so that the body 17 is filled up to the very top.

To prevent the quantity of powder or fibers from falling out along the vertical edges 14, the faces 16, 18 projecting upwardly from the box base area 19 of the body 17 should be joined together in the area of the vertical edges 14. This may take place, for example, in that on the blank for the body 17, tabs hang at the lateral end-face edges of the areas which are attached at the front and the rear and which later form the longitudinal end faces 18 by folding upwardly, these tabs in each case protruding outwardly beyond the lateral end-face edges. After these longitudinal end faces 18 are folded up at the folded edges 12, two tabs each may be folded inwardly over the longitudinal end faces in the area of the same border face 16 along the edges 14, i.e., folded toward one another until they are in a shared plane. In addition, a tab may hang at the free upper edge of the border face 16 in question, the tab being approximately the same size as the particular border face 16 itself. After a border face 16 is folded up on the outside, next to the tabs of the front and rear longitudinal end faces 16 at this location, this tab may be folded in at its upper edge at the border face 16 in question, and lastly, folded down, so that in each case it engages inwardly around a total of two tabs of the longitudinal end faces 18.

The lid 20 is used for also closing the body 17 of the paperboard box 11 at the top. There are several options for the structure of the lid.

In a first embodiment not depicted in the drawing, the lid 20 may be produced as a part that is completely separate from the body 17, having the same shape as the body but slightly larger, so that in the state which is lowered with respect to the body 17, wherein the base area 19 of the lid 20 is thus on top, i.e., above the border and end faces laterally adjoining same and extending downwardly therefrom in an apron shape, the lid may be pulled over the body 17 in order to close it. For fixing, adhesive tape may then be affixed along all four edges, with approximately one half of the tape running along the body 17, and the other half running along the lid 20.

However, in the embodiment depicted in FIG. 4, the lid 20 is not separate from the body 17.

Instead, the base area 19 of the lid 20 hangs over a folded edge 21 at the rear longitudinal end face 18 of the body 17, thus adjoining the upper edge of the body.

In each case a border face 24 and end face 25 are situated at the opposite edge 22 of the lid base area 19 and at its two lateral edges 23, and extend perpendicularly thereto.

The heights of the border face 24 and of the two lateral end faces 25 of the lid 20 are preferably equal.

The two border faces 18 and the two lateral end faces 16 of the body 17 are likewise preferably the same size.

Lastly, the common height of the border faces 24 and end faces 25 of the lid 20 should be equal to the common height of the border faces 18 and end faces 16 of the body 17.

The border faces 24 and end faces 25 of the lid 20 which hang downwardly in an apron-like manner, the same as the border faces 16 and end faces 18 of the body 17, may be joined together in the areas of the corners 26 or the shared edges, for example based on the folding principle described above with reference to the body 17.

Even for a loose lid, the border faces and end faces 16, 18; 24, 25 of the body 17 and/or of the lid 20 which adjoin one another in each case may be joined together in the area of some or preferably all vertical edges 14 by appropriate folding.

If the lid 20 is pivoted downwardly at the folded edge 21 and pulled over the outer faces 16, 18 of the body 17, the overall result is a strictly cuboidal shape with pronounced edges 12, 13, 22, 23 and corners 15, 26.

If the paperboard box 11 is thus closed by the lid 20 after filling the body 17 with the core material, the lid 20 may be glued to the lower base area 19 of the body 17 in the area of one or more of its three free edges 27, and thus closed.

The body may then be enveloped by a vacuum-tight foil, and after its contents are evacuated, the enveloping foil which initially incompletely encloses the body may be welded completely, and thus air-tight. Pressing of the contents is possible when the paperboard box 11 is used, in particular when the lid 20 engages over the body 17.

To simplify the evacuation operation, also for the paperboard box 11, valves which allow air, but not particles, to escape may be mounted at one or more locations. However, the slits in the area of the free end-face edges 27 of the lid 20 may fulfill a similar function; these slits form a type of artificial valve, in particular for a lid 20 which is pressed firmly onto the body 17, which allows gases such as air to escape, but not particles. In this regard, for adhering the lid 20 to the body 17 it may be advantageous to use an air-permeable adhesive tape in order to allow air to escape on all sides at this location.

LIST OF REFERENCE NUMERALS

1 Paper bag
2 Longitudinal edge
3 Folded edge
4 Folded edge
5 Corner
6 Border area
7 Adhesive
8 Longitudinal end-face side
9 Bag base side
10 Folding triangle
11 Paperboard box
12 Longitudinal edge
13 Folded edge
14 Edge
15 Corner
16 Border face
17 Body
18 Longitudinal end face
19 Box base area
20 Lid
21 Folded edge
22 Edge
23 Edge
25 Border face
25 End face
26 Corner
27 Edge

The invention claimed is:

1. A foil-wrapped vacuum insulation panel having a core, and an air-tight envelope in the form of a wrapping foil surrounding the core made of a loose powder or a loose granulate, wherein between the core made of powder or granulate and the air-tight wrapping foil, there is provided at least one intermediate layer of cardboard and/or paperboard, which completely envelopes, in a powder-tight manner, the core made of powder or granulate, and which intermediate layer of cardboard and/or paperboard is formed as a cuboid box which has approximately the same shape as the finished vacuum insulation panel and comprises a body with a filling opening which is closed by a lid, wherein the loose powder or the loose granulate is filled into the cuboid box in such an amount that the body of the cuboid box is completely filled up to its very top, and the shape of the vacuum insulation panel is acquired only via the cuboid box and not by the powder or granulate, while the structural integrity of the core is not sufficient to retain the shape of the core on its own without the surrounding cardboard and/or paperboard cuboid box.

2. The foil-wrapped vacuum insulation panel according to claim 1, characterized in that a single layer of cardboard has a grammage of 100 g/m² or more.

3. The foil-wrapped vacuum insulation panel according to claim 1, characterized in that a single layer of cardboard has a grammage of 250 g/m² or less.

4. The foil-wrapped vacuum insulation panel according to claim 1, characterized in that the at least one intermediate layer of cardboard comprises multiple layers of paper and/or the at least one intermediate layer of paperboard comprises multiple layers of cardboard.

5. The foil-wrapped vacuum insulation panel according to claim 4, characterized in that at least one paper layer is glued to one or two adjoining paper layers to form a single laminate.

6. The foil-wrapped vacuum insulation panel according to claim 4, characterized in that at least one of the multiple layers of cardboard has a corrugated profile.

7. The foil-wrapped vacuum insulation panel according to claim 4, characterized in that a total of three layers of paper, having a grammage in each case of 40 g/m² or more, and/or having a grammage in each case of 250 g/m² or less, are provided, so that, when joined together, the multiple layers of paper and/or cardboard of the intermediate layer of cardboard and/or paperboard have a total grammage between 120 g/m² and 750 g/m².

8. The foil-wrapped vacuum insulation panel according to claim 1, characterized in that the paperboard is made up of 40% by weight or more of recovered paper.

9. The foil-wrapped vacuum insulation panel according to claim 1, characterized in that the cuboid box is an open and/or closable paperboard box which is produced from a single cardboard, or paperboard blank.

10. The foil-wrapped vacuum insulation panel according to claim 9, characterized in that the paperboard blank is folded and/or glued in order to form the open and/or closable paperboard box.

11. The foil-wrapped vacuum insulation panel according to claim 1, characterized in that the filling opening of the cardboard and/or paperboard cuboid box is closed by the lid after the core material is filled in.

12. The foil-wrapped vacuum insulation panel according to claim 11, characterized in that, after the core material is filled in, the filling opening of the cardboard and/or paperboard cuboid box is closed by the lid, either by placing a loose lid on top or by folding shut a lid which hangs on one side of the body of the cuboid box.

13. The foil-wrapped vacuum insulation panel according to claim 12, characterized in that the lid in the closed state covers a base surface or main surface of a panel-shaped vacuum insulation element.

14. The foil-wrapped vacuum insulation panel according to claim 1, characterized in that the cardboard and/or paperboard cuboid box has at least one ventilation opening which allows the contained air to escape when the core material is filled in and/or when the paperboard box is compressed or evacuated.

15. The foil-wrapped vacuum insulation panel according to claim 14, characterized in that a ventilation opening of the at least one ventilation opening is formed by one or more perforations, and/or by one or more needlings.

16. The foil-wrapped vacuum insulation panel according to claim 1, characterized in that the cardboard and/or paperboard cuboid box has at least one valve or at least one valve area.

17. The foil-wrapped vacuum insulation panel according to claim 16, comprising in an area of the at least one valve, perforations or needlings, said perforations or needlings are provided in the at least one intermediate layer of cardboard and/or paperboard, and are offset with respect to one another.

18. The foil-wrapped vacuum insulation panel according to claim 1, characterized in that the powder or granulate of the core is made of a porous powder and/or a fibrous material.

19. The foil-wrapped vacuum insulation panel according to claim 1, characterized in that the powder or granulate of the core is made of one or more materials comprised by the group consisting of pyrogenic silica, precipitated silica, perlite and a powder of an organic foam material.

20. The foil-wrapped vacuum insulation panel according to claim 1, characterized in that the powder or granulate of the core is made of pyrogenic silica, and whereby in the filled and evacuated state of the vacuum insulation panel, the density of the core made of pyrogenic silica is between 120 kg/m³ and 180 kg/m³.

21. The foil-wrapped vacuum insulation panel according to claim 1, characterized in that the wrapping foil forming the air-tight envelope includes at least one from the group consisting of a metal foil, an aluminum foil, and a metallized foil.

22. The foil-wrapped vacuum insulation panel according to claim 1, wherein the lid of the cuboid box comprises an apron which engages externally over an edge that protrudes upwardly along a base area of the body.

23. The foil-wrapped vacuum insulation panel according to claim 22 wherein the lid of the cuboid box has the same shape as the body of the cuboid box but slightly larger, so that the lid of the cuboid box may be pulled over the body of the cuboid box in order to close the cuboid box.

24. A foil-wrapped vacuum insulation panel having a core, and an air-tight envelope in the form of a wrapping foil surrounding the core made of a loose powder or a loose granulate, wherein between the core made of powder or granulate and the air-tight wrapping foil, there is provided at least one intermediate layer of cardboard and/or paperboard, which completely envelopes, in a powder-tight manner, the core made of powder or granulate and which intermediate layer of cardboard and/or paperboard is formed as a cuboid box which has approximately the same shape as the finished vacuum insulation panel and comprises a body with a filling opening which is closed by a lid, wherein the loose powder or the loose granulate is filled into the cuboid box in such an amount that the body of the cuboid box is completely filled up to its very top, and the shape of the vacuum insulation panel is acquired only via the cuboid box and not by the powder or granulate, while the structural integrity of the core is not sufficient to retain the shape of the core on its own without the surrounding cardboard or paperboard box, because the loose powder or the loose granulate of the core is filled into the cardboard and/or paperboard cuboid box in the powdered state, without active mechanical pressing.

25. A foil-wrapped vacuum insulation panel having a core, and an air-tight envelope in the form of a wrapping foil surrounding the core made of powder or granulate, wherein between the core made of a loose powder or a loose granulate and the air-tight wrapping foil, there is provided at least one intermediate layer of cardboard and/or paperboard, which completely envelopes, in a powder-tight manner, the core made of powder or granulate and which intermediate layer of cardboard and/or paperboard is formed as a cuboid box which has approximately the same shape as the finished vacuum insulation panel and comprises a body with a filling opening which is closed by a lid, wherein the loose powder or the loose granulate is filled into the cuboid box in such an amount that the body of the cuboid box is completely filled up to its very top, and the shape of the vacuum insulation panel is acquired only via the cuboid box and not by the powder or granulate, while the structural integrity of the core is not sufficient to retain the shape of the core on its own without the surrounding cardboard or paperboard box, because the loose powder or the loose granulate of the core is filled into the cardboard and/or paperboard cuboid box in the powdered state, without active mechanical pressing, wherein the loose powder or the loose granulate is made of pyrogenic silica, and the core has a density between 140 kg/m$^3$ and 160 kg/m$^3$.

* * * * *